(12) United States Patent
Leu (10) Patent No.: US 12,105,304 B2
(45) Date of Patent: Oct. 1, 2024

(54) AUGMENTED REALITY DISPLAY DEVICE

(71) Applicant: Jorjin Technologies Inc., New Taipei (TW)

(72) Inventor: Chun-Wei Leu, New Taipei (TW)

(73) Assignee: Jorjin Technologies Inc., New Taipei (TW)

( * ) Notice: Subject to any disclaimer, the term of this patent is extended or adjusted under 35 U.S.C. 154(b) by 458 days.

(21) Appl. No.: 17/511,512

(22) Filed: Oct. 26, 2021

(65) Prior Publication Data

US 2023/0108544 A1    Apr. 6, 2023

(30) Foreign Application Priority Data

Oct. 1, 2021  (TW) .................................. 110136786

(51) Int. Cl.
| | |
|---|---|
| G02B 30/25 | (2020.01) |
| G02B 27/28 | (2006.01) |
| G02B 30/36 | (2020.01) |
| G06T 19/00 | (2011.01) |

(52) U.S. Cl.
CPC ............ *G02B 30/25* (2020.01); *G02B 27/283* (2013.01); *G02B 30/36* (2020.01); *G06T 19/006* (2013.01)

(58) Field of Classification Search
CPC ...... G02B 30/25; G02B 30/36; G02B 27/283; G06T 19/006
USPC ......................................................... 359/465
See application file for complete search history.

(56) References Cited

U.S. PATENT DOCUMENTS

| | | |
|---|---|---|
| 6,222,677 B1 | 4/2001 | Budd et al. |
| 9,134,534 B2 | 9/2015 | Border et al. |
| 2020/0089017 A1 | 3/2020 | Wu et al. |
| 2020/0292816 A1 | 9/2020 | Liu et al. |

FOREIGN PATENT DOCUMENTS

| | | |
|---|---|---|
| CN | 1106937 | 4/2003 |
| CN | 108897136 | 11/2018 |
| CN | 111123526 | 5/2020 |
| CN | 211236457 | 8/2020 |
| CN | 111880311 | 11/2020 |

(Continued)

OTHER PUBLICATIONS

"Office Action of Taiwan Counterpart Application", issued on Sep. 5, 2022, p. 1-p. 6.

(Continued)

*Primary Examiner* — Wyatt A Stoffa
*Assistant Examiner* — Grant A Gagnon
(74) *Attorney, Agent, or Firm* — JCIPRNET (57) ABSTRACT

An augmented reality display device configured to be disposed on a head of a user includes a display, a relay lens set, a beam splitting module, and a curved mirror. The display is configured to emit an image beam. The relay lens set is disposed on a path of the image beam. The beam splitting module is disposed on a path of the image beam from the relay lens set. The curved mirror is configured to reflect the image beam from the beam splitting module back to the beam splitting module. The image beam reflected by the curved mirror penetrates through the beam splitting module and is then transmitted to a pupil of the user. The beam splitting module includes a polarizer, a brightness enhancement film, and a phase retardation film stacked together in sequence from a side adjacent to the pupil to a side adjacent to the curved mirror.

20 Claims, 11 Drawing Sheets

(56) References Cited

FOREIGN PATENT DOCUMENTS

| | | |
|---|---|---|
| CN | 112444979 | 3/2021 |
| TW | 201901238 | 1/2019 |
| WO | 2016133886 | 8/2016 |

OTHER PUBLICATIONS

Bin Xie et al., "Design of a brightness-enhancement-film-adaptive freeform lens to enhance overall performance in direct-lit light-emitting diode backlighting", Applied Optics, vol. 54, No. 17, Jun. 9, 2015, pp. 1-7.

"Search Report of Europe Counterpart Application", issued on May 9, 2022, p. 1-p. 12.

AUGMENTED REALITY DISPLAY DEVICE

CROSS-REFERENCE TO RELATED APPLICATION

This application claims the priority benefit of Taiwan application serial no. 110136786, filed on Oct. 1, 2021. The entirety of the above-mentioned patent application is hereby incorporated by reference herein and made a part of this specification.

BACKGROUND

Technology Field

The disclosure relates to a display device, and particularly, to an augmented reality (AR) display device.

Description of Related Art

Due to the vigorous development of augmented reality technology in recent years, there have been a variety of head-mounted display (HMD) optical systems. Optical engines can be roughly categorized into different optical designs, such as geometric waveguide design, diffractive waveguide design, free-form surface design, birdbath design, and the like.

The advantages of the birdbath optical design are the system is symmetrically designed, it has a good image quality level, the difficulty of the manufacturing process is relatively low, and the design comes with an advantageous low cost. However, the optical path of the design has more losses in foldbacks and the luminous flux, so there is a problem of poor efficiency. Moreover, the light path is folded back in two reflecting elements (a beam splitter and a curved mirror), and it is also prone to secondary reflection imaging (ghost images). There are technologies that use the principles of polarization beam splitters and quarter-wave plates to improve luminous flux efficiency, but to achieve good image quality, band-pass polarization beam splitters and achromatic wave plates are used. Both materials are glass with characteristics of being thin and fragile, so they are not only costly but also difficult to manufacture. Moreover, the field of view of such a design is limited by the size of the display. It requires a larger display for a larger field of view.

SUMMARY

The disclosure provides an augmented reality display device. In the augmented reality display device, a larger field of view may be obtained from a smaller display, the resolution of an optical system may be improved, and the problems of luminous flux efficiency and ghost images may be improved, while maintaining image quality and reducing the production cost and the difficulty in manufacturing.

An embodiment of the disclosure provides an augmented reality display device configured to be disposed on a head of a user. The augmented reality display device includes a display, a relay lens set, a beam splitting module, and a curved mirror. The display is configured to emit an image beam. The relay lens set is disposed on a path of the image beam. The beam splitting module is disposed on a path of the image beam from the relay lens set. The curved mirror is configured to reflect the image beam from the beam splitting module back to the beam splitting module. The image beam reflected by the curved mirror penetrates through the beam splitting module and is then transmitted to a pupil of the user.

The beam splitting module includes a polarizer, a brightness enhancement film, and a phase retardation film stacked together in sequence from a side adjacent to the pupil to a side adjacent to the curved mirror.

The augmented reality display device of the embodiment of the disclosure uses a relay lens set to magnify the display screen of the display, so a smaller display may be configured to obtain a larger field of view, and the resolution of the optical system is improved. Moreover, the augmented reality display device of the embodiment of the disclosure uses a polarizer, a brightness enhancement film, and a phase retardation film stacked together as a beam splitting module, so problems of luminous flux efficiency and ghost images may be improved, while maintaining image quality and reducing the production cost and the difficulty in manufacturing.

DESCRIPTION OF THE EMBODIMENTS

Figure 1:
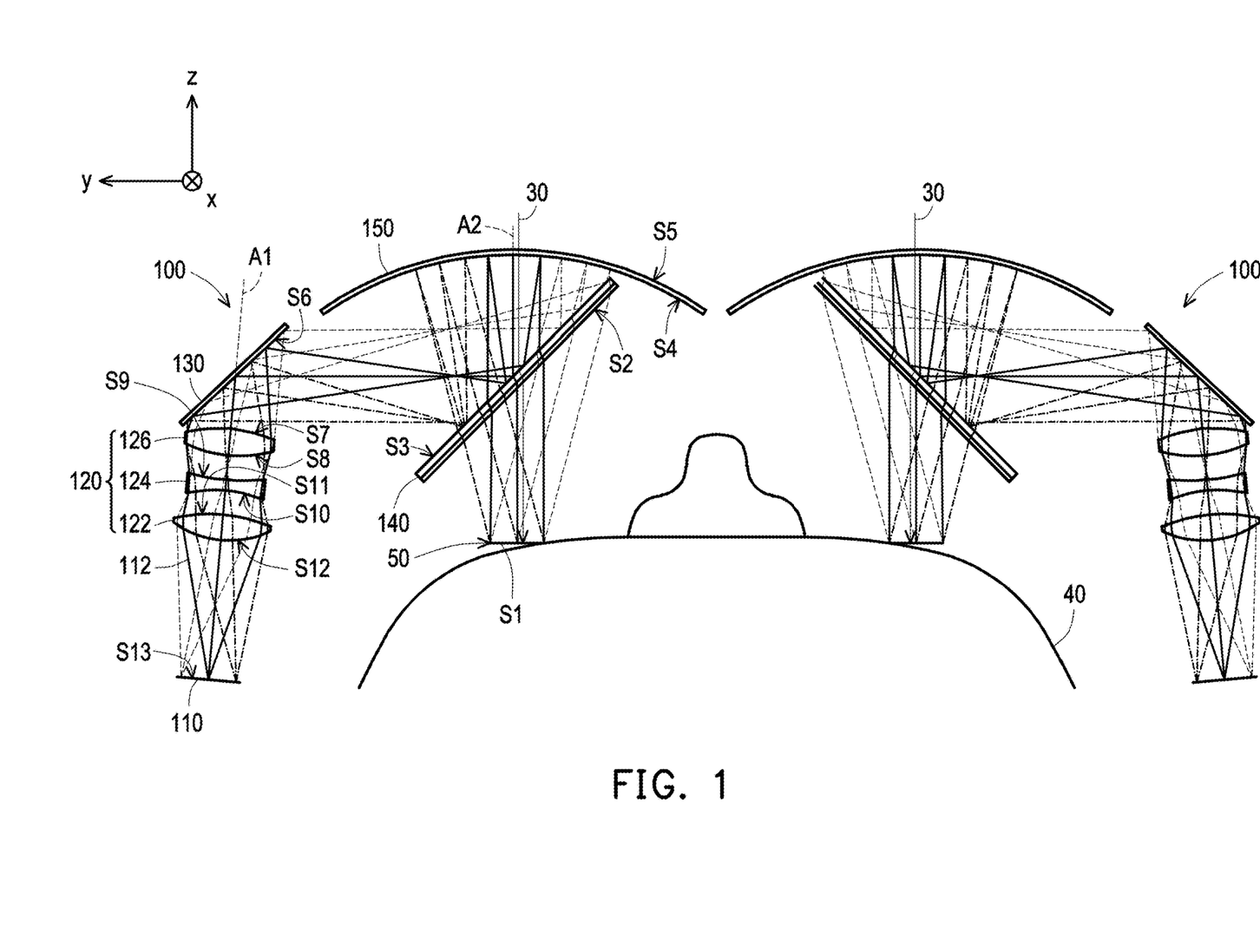
FIG. 1 is a structure diagram illustrating an optical path of an augmented reality display device according to an embodiment of the disclosure.
Figure 2A:
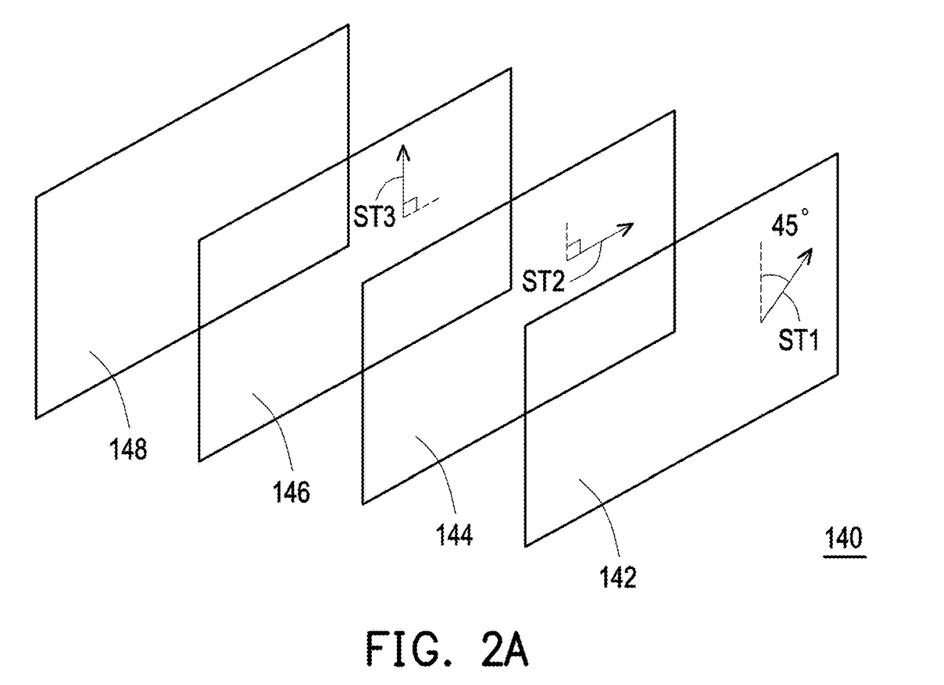
FIG. 2A is a schematic perspective view of the beam splitting module in FIG. 1.
Figure 2B:
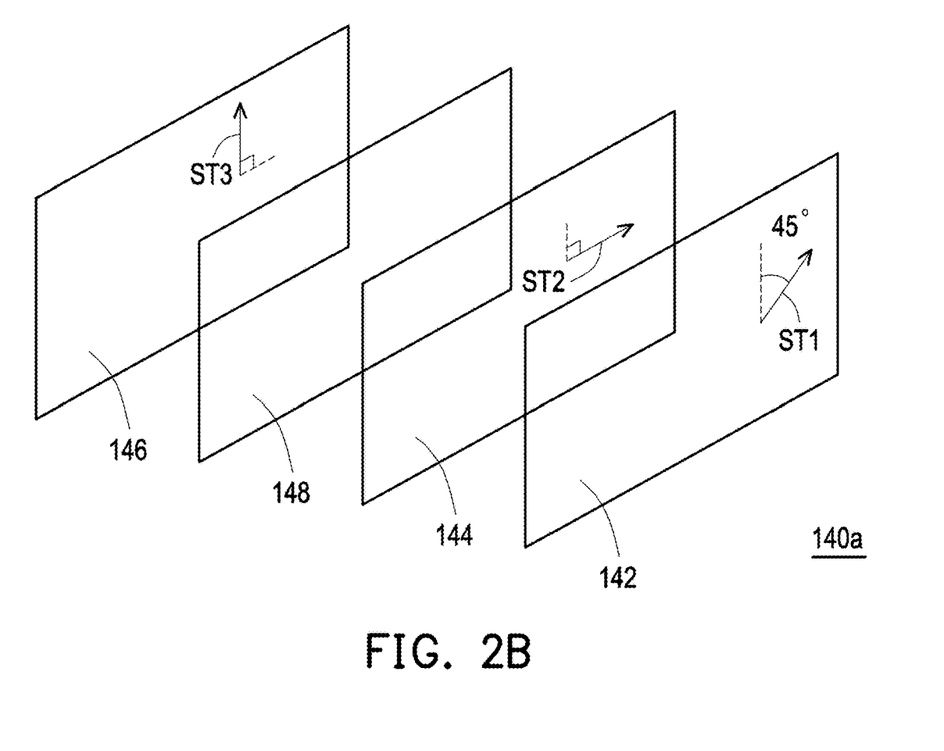
FIG. 2B is a schematic perspective view of another modification of the beam splitting module in FIG. 2A.
Figure 3:
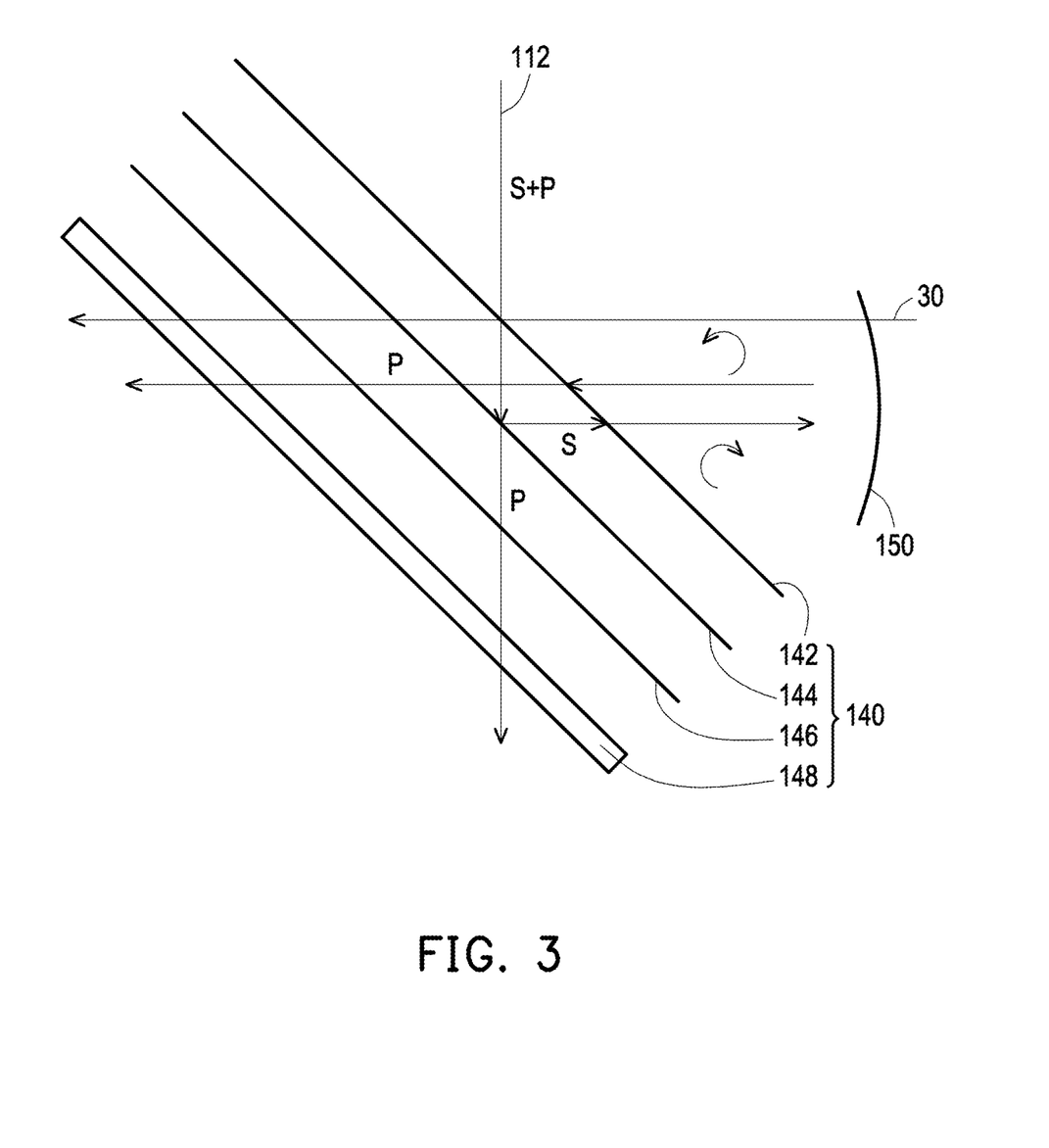
FIG. 3 is a schematic cross-sectional view illustrating the effect of the beam splitting module in FIG. 1 on an image beam.
Figure 4:
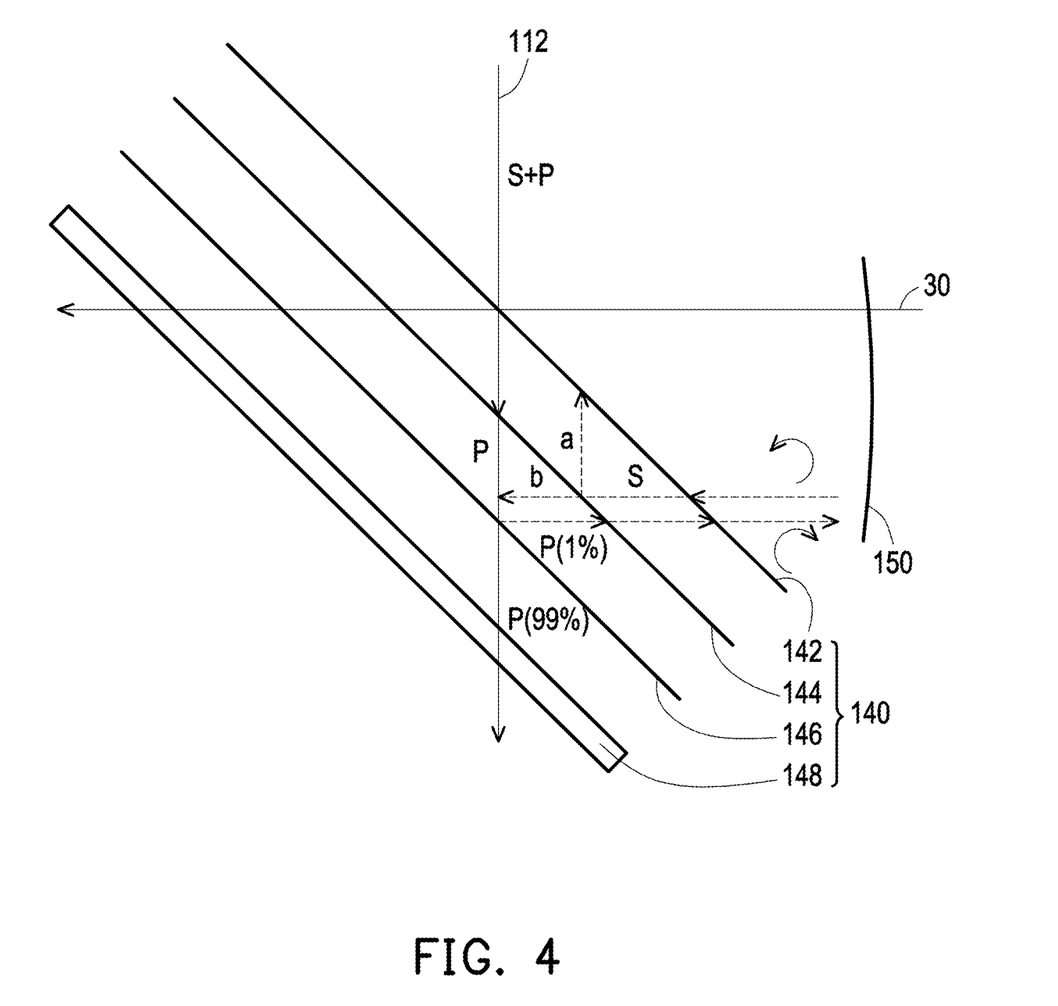
FIG. 4 is a schematic cross-sectional view illustrating the suppression of ghost images by the beam splitting module in FIG. 1.

FIG. 1 is a structure diagram illustrating an optical path of an augmented reality display device according to an embodiment of the disclosure. FIG. 2A is a schematic perspective view of the beam splitting module in FIG. 1. FIG. 2B is a schematic perspective view of another modification of the beam splitting module in FIG. 2A. FIG. 3 is a schematic cross-sectional view illustrating the effect of the beam splitting module in FIG. 1 on an image beam. FIG. 4 is a schematic cross-sectional view illustrating the suppression of ghost images by the beam splitting module in FIG. 1. Referring to FIG. 1, FIG. 2A, and FIG. 3, in the embodiment, an augmented reality display device 100 is configured to be disposed on a head 40 of a user. The augmented reality display device 100 includes a display 110, a relay lens set 120, a beam splitting module 140, and a curved mirror 150. The display 110 is configured to emit an image beam 112. In the embodiment, the display 110 may include an organic light-emitting diode (OLED) display panel, a micro light-emitting diode (micro-LED) display panel, an LCD panel, a liquid-crystal-on-silicon (LCOS) panel, a digital micro-mirror device (DMD) or other spatial light modulators (SLMs).

The relay lens set 120 is disposed on the path of the image beam 112, and the beam splitting module 140 is disposed on the path of the image beam 112 from the relay lens set 120. The curved mirror 150 is configured to reflect the image beam 112 from the beam splitting module 140 back to the beam splitting module 140. The image beam 112 reflected by the curved mirror 150 penetrates the beam splitting module 140 and is transmitted to a pupil 50 of an eye of the user. After the image beam 112 passes through the pupil 50, an image is formed on the retina of the user's eye, and accordingly the user can see the image displayed on the display 110, which is an enlarged virtual image in front of the eyes.

The beam splitting module 140 includes a polarizer 146, a brightness enhancement film 144, and a phase retardation film 142 stacked together in sequence from a side adjacent to the pupil 50 to a side adjacent to the curved mirror 150. External light 30 sequentially penetrates through the curved mirror 150, the phase retardation film 142, the brightness enhancement film 144, and the polarizer 146 and then is transmitted to the pupil 50. Accordingly, the eyes of the user can see not only the virtual image displayed on the display 110 but also the outside scenery, which may achieve the visual effect of augmented reality.

In the embodiment, the brightness enhancement film 144 is a reflective polarizing film (e.g., a dual brightness enhancement film (DBEF) produced by 3M Company, USA) or an advanced polarizer film with a thinner thickness and better reflectivity (e.g., an advanced polarizer film (APF) produced by 3M, USA). That is, the brightness enhancement film is formed by stretching at least two polymer film layers with different refractive indexes. Moreover, in the embodiment, the phase retardation film 142 is a polymer phase retardation film, such as a polymer quarter-wave plate. The phase retardation film 142 is a durable birefringent polymer sheet configured to change the state of polarized light. The embodiment specifically refers to a quarter-wavelength polymer phase retardation film. In the embodiment, at a wavelength of 450 nm to 700 nm, the phase retardation film 142 may have high transparency with a transmittance of 90% or more and a good achromatic effect.

Moreover, in the embodiment, the augmented reality display device 100 further includes a reflecting sheet 130 disposed on the path of the image beam 112 and configured to reflect the image beam 112 from the relay lens set 120 to the beam splitting module 140.

In the embodiment, the curved mirror 150 has a surface S4 (i.e., a concave surface) facing the beam splitting module 140 and a surface S5 (i.e., a convex surface) facing away from the beam splitting module 140. A partially penetrating partially reflecting film is formed on the surface S4 (i.e., concave surface), the reflectivity thereof is 50% to 70%, for example, and the transmittance thereof is 50% to 30%, for example. The surface S5 (convex surface) may be coated with an anti-reflection film to increase the transmittance and prevent ghost images caused by reflection.

In the embodiment, as shown in FIG. 2A and FIG. 3, the beam splitting module 140 further includes a transparent substrate 148. The transparent substrate 148, the polarizer 146, the brightness enhancement film 144, and the phase retardation film 142 are stacked together in sequence from the side adjacent to the pupil 50 to the side adjacent to the curved mirror 150. However, in a beam splitting module 140a of another embodiment, as shown in FIG. 2B, the polarizer 146, the transparent substrate 148, the brightness enhancement film 144, and the phase retardation film 142 may also be stacked together in sequence from the side adjacent to the pupil 50 to the side adjacent to the curved mirror 150. The transparent substrate 148 may include glass or optical plastic material, and the surface is coated with an anti-reflection film or attached with a moth-eye film, so that the light transmittance can reach 98% or more.

In the embodiment, the image beam 112 emitted by the display 110 may be unpolarized light, that is, S-polarized light and P-polarized light are included. After the image beam 112 from the relay lens set 120 penetrates through the phase retardation film 142 (after the image beam 112 from the reflecting sheet 130 penetrates through the phase retardation film 142 in the embodiment, for example), the S-polarized light in the image beam 112 is reflected by the brightness enhancement film 144 back to the phase retardation film 142. The S-polarized light in the image beam 112 is converted into circularly polarized light by the phase retardation film 142 and transmitted to the curved mirror 150, the curved mirror 150 reflects the circularly polarized light back to the phase retardation film 142, the phase retardation film 142 converts circularly polarized light into P-polarized light, and the P-polarized light sequentially penetrates through the brightness enhancement film 144 and the polarizer 146 and is transmitted to the pupil 50. The brightness enhancement film 114 is adapted for reflecting the S-polarized light and for allowing the P-polarized light to pass through. That is, the brightness enhancement film 114 allows most of the P-polarized light (e.g., greater than about 98%) to pass through, the polarizer 146 may also allow most of the P-polarized light (e.g., about 99%) to pass through and to finally enter the pupil 50 of the user with very little loss, and therefore the efficiency of the luminous flux is improved.

Moreover, the stacked structure of the beam splitting module 140 may also effectively eliminate secondary reflection imaging (i.e., ghost images), which is illustrated in detail as follows. The P-polarized light of the image beam 112 from the display 110 is split by the brightness enhancement film 144 and incident to the polarizer 146, the penetration axis of the polarizer 146 and the polarization direction of the P-polarized light fall on the same plane of incidence (i.e., the paper plane of FIG. 4), and most of the P-polarized light may pass through the polarizer 146 without disturbing the imaging. However, about 1% of the P-polarized light may be reflected by the polarizer 146 and then become circularly polarized light after sequentially passing through the brightness enhancement film 144 and the phase retardation film 142. The circularly polarized light is incident to the curved mirror 150 and then is reflected by the curved mirror 150 back to the phase retardation film 142. After the phase retardation film 142 converts the circularly polarized light into S-polarized light, the S-polarized light is incident to the brightness enhancement film 144. The brightness enhancement film may reflect most of the S-polarized light (about 90%) into light a as shown in FIG. 4. The light a may not be transmitted to the eyes of the user and therefore may not be observed by the user to form the secondary reflection imaging (i.e. ghost images). Moreover, the remaining part (less than 10%) of the S-polarized light is transmitted to the eyes of the user (i.e., light b in FIG. 4), and the polarization direction of the light b is the S polarization direction. Therefore, the light b penetrates through the brightness enhancement film 144 and then may also be absorbed by the polarizer 146, so without transmission to the eyes of the user, there is no secondary reflection imaging (i.e. ghost images).

In the embodiment, as shown in FIG. 2A, a stretching direction ST2 of the brightness enhancement film 144 is perpendicular to a penetration axis ST3 of the polarizer 146, and an angle of 45 degrees or 135 degrees is between the stretching direction ST2 of the brightness enhancement film 144 and a slow axis ST1 of the phase retardation film 142.

In the embodiment, the relay lens set 120 includes a first lens 122, a second lens 124, and a third lens 126 disposed in sequence from a side adjacent to the display 110 to a side far away from the display 110. The first lens 122 has a positive diopter, which can provide the ability to converge light and contribute to adjusting the total length of the relay lens set 120. The second lens 124 has a negative diopter, which contributes to correcting the aberration generated by the first lens 122 and reduces the sensitivity of the system of the relay lens set 120 to tolerances. The third lens 126 has a positive diopter, which is configured to balance the positive diopter of the relay lens set 120, so as to prevent the positive diopter from being excessively concentrated on the first lens and causing the curvature of the lens surface to be too large. The high-order aberrations caused by the excessive curvature are not easy to be eliminated.

The augmented reality display device 100 of the embodiment adopts the relay lens set 120 to magnify the display screen of the display 110, so a smaller display 110 may be configured to obtain a larger field of view, and the resolution of the optical system may be improved. Moreover, since the augmented reality display device 100 of the embodiment uses the stacked polarizer 146, the brightness enhancement film 144, and the phase retardation film 142 as the beam splitting module 140, the light flux efficiency and ghost images problems may be improved as described above, while maintaining the image quality. Moreover, both the brightness enhancement film 144 and the phase retardation film 142 may include polymer materials, their cost is low, and they are not easily broken, so the production cost and the difficulty in manufacturing are reduced.

In the embodiment, the relay lens set 120 satisfies $0<1/f1+1//f2+1/f3<0.065$, where f1 is the focal length of the first lens, f2 is the focal length of the second lens, and f3 is the focal length of the third lens. Accordingly, the relay lens set 120 can be deployed in an appropriate position, which is suitable for human head wearing.

In the embodiment, the augmented reality display device 100 satisfies $0.04<D/L<0.22$, where D is the half length of the diagonal of the effective area (i.e., the effective display area) of the display 110, and L is the distance between the center point of the effective area of the display 110 and a surface S7 of the third lens 126 facing away from the display 110 on an optical axis A1 of the relay lens set 120. Accordingly, the chief ray angle of the display may be controlled, and the vignetting of the image resulting from the excessively large chief ray angle is prevented.

In the embodiment, the relay lens set 120 satisfies $27.53<|V1-V2|<33.61$ and $27.53<|V3-V2|<33.61$, where V1 is the Abbe number of the first lens 122, V2 is the Abbe number of the second lens 124, and V3 is the Abbe number of the third lens 126. Accordingly, the chromatic aberration of the system may be effectively adjusted.

In the embodiment, the relay lens set 120 satisfies $0<(R2+R1)/(R2-R1)<1$, where R1 is the radius of curvature of a surface S12 of the first lens 122 facing the display 110, and R2 is the radius of curvature of a surface S11 of the first lens 122 facing away from the display 110. Accordingly, the lens surface shape may be effectively adjusted, so that the energy distribution of the light cone emitted from each point in the effective area of the display 110 enters the relay lens set 120 in a balanced manner.

In the embodiment, the relay lens set 120 satisfies $2.25<TL/(T12+T23)<11.52$, where TL is the distance from the surface S12 of the first lens 122 facing the display 110 to the surface S7 of the third lens 126 facing away from the display 110 on the optical axis A1 of the relay lens set 120, T12 is the air gap (i.e., the distance from the surface S11 to a surface S10 on the optical axis A1) between the first lens 122 and the second lens 124 on the optical axis A1, and T23 is the air gap (i.e., the distance from a surface S9 to a surface S8 on the optical axis A1) between the second lens 124 and the third lens 126 on the optical axis A1. Accordingly, the lens thickness and gap may be adjusted to compress the length of the lens barrel for accommodating the relay lens set 120.

In the embodiment, the augmented reality display device 100 satisfies $2.00<Y22/D<2.80$, where D is the half length of the diagonal of the effective area of the display 110, and Y22 is the maximum effective radius of the surface S9 of the second lens 124 facing the third lens 126. Accordingly, the eye box of the optical system may be adjusted, and the radial width of the lens barrel for accommodating the relay lens set 120 may be effectively controlled.

In the embodiment, the curved mirror satisfies $0<|CR2-CR2|/d<1$, where CR1 is the radius of curvature of the concave surface (i.e., the surface S4) of the curved mirror 150 facing the beam splitting module 140, CR2 is the radius of curvature of the convex surface (i.e., the surface S5) of the curved mirror 150 facing away from the beam splitting module 140, and d is the distance from the surface S4 to the surface S5 on an optical axis A2 of the curved mirror 150. Accordingly, the absolute value of the diopter of the curved mirror 150 to the transmitted light (i.e., the external light 30) may be adjusted to be less than 0.02 m-1, so the user may not be affected by the diopter of the curved mirror when observing the external scenery.

Table 1 illustrates the global coordinates and the rotation angle of the surface of each optical element of the augmented reality display device 100 of the embodiment.

TABLE 1

| surface | global coordinates | | | rotation angle Rotation angle relative to x axis |
|---|---|---|---|---|
| | x | Y | z | |
| S1 | 0 | 0 | 0 | 0 |
| S2 | 0 | 0 | 23.9934 | −45 |
| S3 | 0 | 0.48968 | 25.0541 | −45 |
| S4 | 0 | 0.48968 | 43.2377 | 0 |
| S5 | 0 | 0.48968 | 44.7377 | 0 |
| S6 | 0 | 43.4897 | 25.0541 | −47.5 |
| S7 | 0 | 44.1869 | 17.0845 | 5 |
| S8 | 0 | 44.5408 | 13.0398 | 5 |
| S9 | 0 | 44.8701 | 9.27576 | 5 |
| S10 | 0 | 45.0084 | 7.69472 | 5 |
| S11 | 0 | 45.3303 | 4.01538 | 5 |
| S12 | 0 | 45.6642 | 0.19917 | 5 |
| S13 | 0 | 47.5271 | −21.094 | 5 |

In Table 1, the surface S1 is the pupil 50 of the user, the surface S2 is the surface of the beam splitting module 140 facing the pupil 50, the surface S3 is the surface of the beam splitting module 140 facing away from the pupil 50, the surface S4 is the concave surface of the curved mirror 150 facing the beam splitting module 140, the surface S5 is the convex surface of the curved mirror 150 facing away from the beam splitting module 140, a surface S6 is the reflecting surface of the reflecting sheet 130, the surface S7 is the surface of the third lens 126 facing away from the display 110, the surface S8 is the surface of the third lens 126 facing the display 110, the surface S9 is the surface of the second lens 124 facing away from the display 110, the surface S10 is the surface of the second lens 124 facing the display 110, the surface S11 is the surface of the first lens 122 facing away from the display 110, the surface S12 is the surface of the first lens 122 facing the display 110, and the surface S13 is the surface (i.e., the display surface) of the effective area of the display 110.

The x, y, and z coordinates listed in Table 1 are the positions of the optical center of each surface in the global coordinates, and the units of the x, y, and z coordinates are all millimeters. The rotation angles listed in Table 1 are the rotation angle of each surface relative to the x coordinate axis.

Table 2 illustrates the surface parameters of each optical element of the augmented reality display device 100 of the embodiment.

TABLE 2

| surface | radius of curvature (mm) | pitch (mm) | material | refractive index | Abbe number |
|---|---|---|---|---|---|
| S2 | infinity | 1.5000 | plastic | 1.492 | 57.44 |
| S3 | infinity | 18.1837 | | | |
| S4 | −53.7811 | 1.5000 | plastic | 1.544 | 56.02 |
| S5 | −54.2187 | −1.5 | | | |
| S4 | −53.7811 | −18.1837 | plastic | 1.544 | 56.02 |
| S3 | infinity | 43.0000 | | | |
| S6 | infinity | −8.0000 | | | |
| S7 | −18.0713 | −4.0601 | plastic | 1.544 | 56.02 |
| S8 | 18.4455 | −3.7785 | | | |
| S9 | 28.8047 | −1.5871 | plastic | 1.642 | 22.41 |
| S10 | −15.9031 | −3.6934 | | | |
| S11 | −19.2930 | −3.8308 | plastic | 1.544 | 56.02 |
| S12 | 14.4939 | −21.3742 | | | |
| S13 | infinity | — | | | |

In Table 2, the pitch refers to the distance from the optical center of the surface of the row to the optical center of the surface of the next row. For example, the pitch of the surface S2 of 1.5000 mm represents that the distance from the optical center of the surface S2 to the optical center of the surface S3 is 1.5000 mm. In the embodiment, both the surface S7 and the surface S8 are convex surfaces, both the surface S9 and the surface S10 are concave surfaces, and both the surface S11 and the surface S12 are convex surfaces.

Among the surfaces, the surfaces S4, S5, S7, S8, S9, S10, S11, and S12 are aspherical, which can be expressed by the aspherical formula as follows.

$$Z(Y) = \frac{Y^2}{R} / \left(1 + \sqrt{1 - (1+K)\frac{Y^2}{R^2}}\right) + \sum_{i=1}^{n} a_{2i} \times Y^{2i} \quad (1)$$

In the formula (1), R is the radius of curvature of the lens surface near the optical axis A; Y is the vertical distance between the point on the aspheric surface and the optical axis A; Z is the depth of the aspheric surface (the vertical distance between the point having the distance Y from the optical axis A on the aspheric surface and the tangent plane to the vertex on the optical axis A of the aspheric surface); K is the conic constant; and $a_{2i}$ is the 2i-th order aspheric coefficient. Table 3 lists the aspheric parameters of the surfaces S4, S5, S7, S8, S9, S10, S11, and S12 of the augmented reality display device 100 of the embodiment.

TABLE 3

| surface | K | $a_4$ | $a_6$ | $a_8$ |
|---|---|---|---|---|
| S4 | 0.0284 | 2.4777E-07 | 5.9506E-11 | −1.2749E-13 |
| S5 | 0.0269 | 2.7703E-07 | 9.0284E-12 | −9.1081E-14 |
| S7 | −2.3498 | 3.4200E-05 | 6.4826E-08 | 7.7479E-10 |
| S8 | −2.4562 | −3.5915E-05 | 1.8352E-07 | −7.5195E-11 |
| S9 | −4.6716 | −1.6747E-05 | −9.8384E-08 | 4.1060E-09 |
| S10 | −2.3690 | 4.9646E-05 | 3.1155E-07 | −2.2855E-09 |
| S11 | −1.8347 | 3.4796E-05 | 4.2896E-07 | −1.2516E-09 |
| S12 | −1.1385 | −1.3242E-05 | 2.9633E-07 | 1.2246E-09 |

In the embodiment, the aspheric coefficients $a_2$ of the surfaces S4, S5, S7, S8, S9, S10, S11, and S12 are all zero.

In the embodiment, the effective focal length EFL of the augmented reality display device 100 is −15.50 mm, the f-number FNO is 1.94, the diameter EPD of the eye box where the pupil 50 is located is 8 mm, and the field of view FOV (D) in the diagonal direction is 35.04 degrees. Table 4 lists numerical examples of some parameters of the augmented reality display device 100 of the embodiment.

TABLE 4

| EFL(mm) | −15.5 | V3 | 56.015 | 1/f1 + 1/f2 + 1/f3 | 0.057 |
|---|---|---|---|---|---|
| FNO | 1.94 | R1(mm) | 14.494 | D/L | 0.063 |
| FOV(D) | 35.04° | R2(mm) | −19.293 | \|V1 − V2\| | 33.606 |
| f1(mm) | 15.849 | TL | 16.950 | \|V3 − V2\| | 33.606 |
| f2(mm) | −15.736 | T12 | 3.693 | (R2 + R1)/(R2 − R1) | 0.142 |
| f3(mm) | 17.467 | T23 | 3.778 | TL/(T12 + T23) | 2.268 |
| L(mm) | 38.324 | Y22 | 5.823 | Y22/$D_H$ | 2.403 |
| D(mm) | 2.423 | CR1 | −53.781 | \|CR2 − CR1\|/d | 0.292 |
| V1 | 56.015 | CR2 | −54.219 | | |
| V2 | 22.409 | D | 1.5 | | |

Figure 5A:
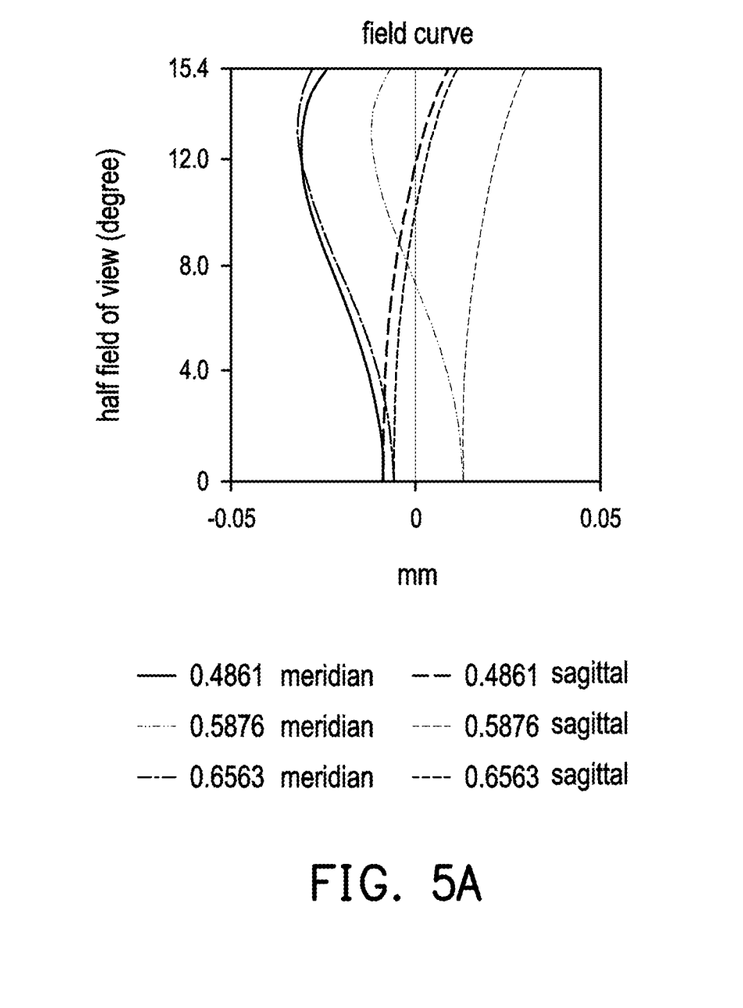
FIG. 5A illustrates a field curve of an optical simulation of the augmented reality display device of FIG. 1.
Figure 5B:
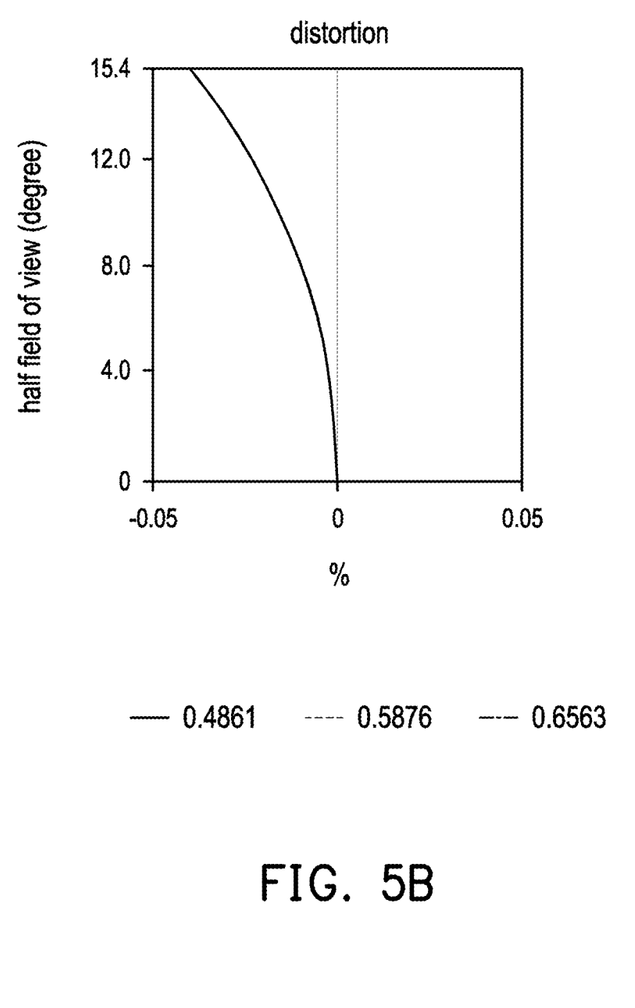
FIG. 5B illustrates a distortion of an optical simulation of the augmented reality display device of FIG. 1.
Figure 5C:
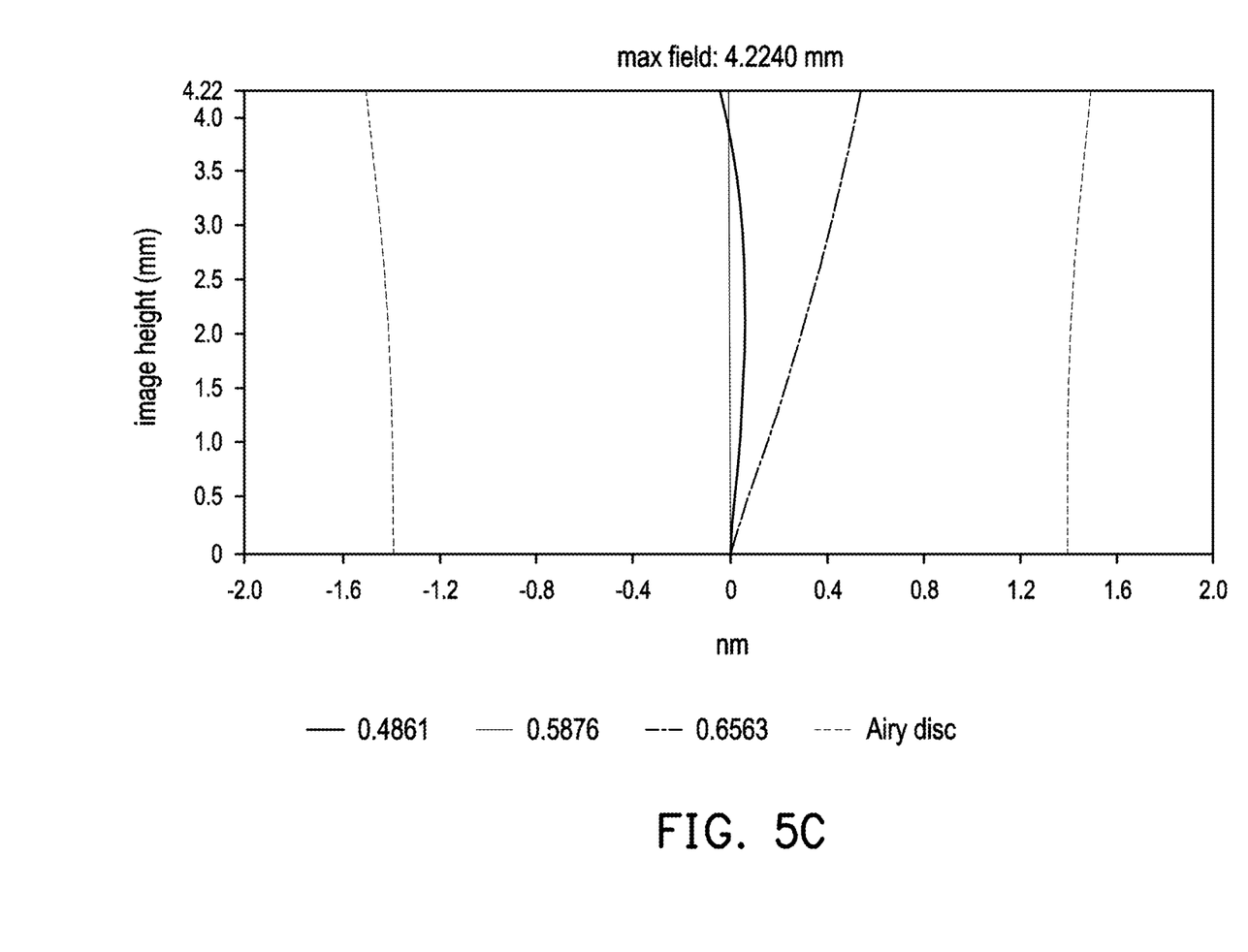
FIG. 5C illustrates a lateral color of an optical simulation of the augmented reality display device of FIG. 1.
Figure 5D:
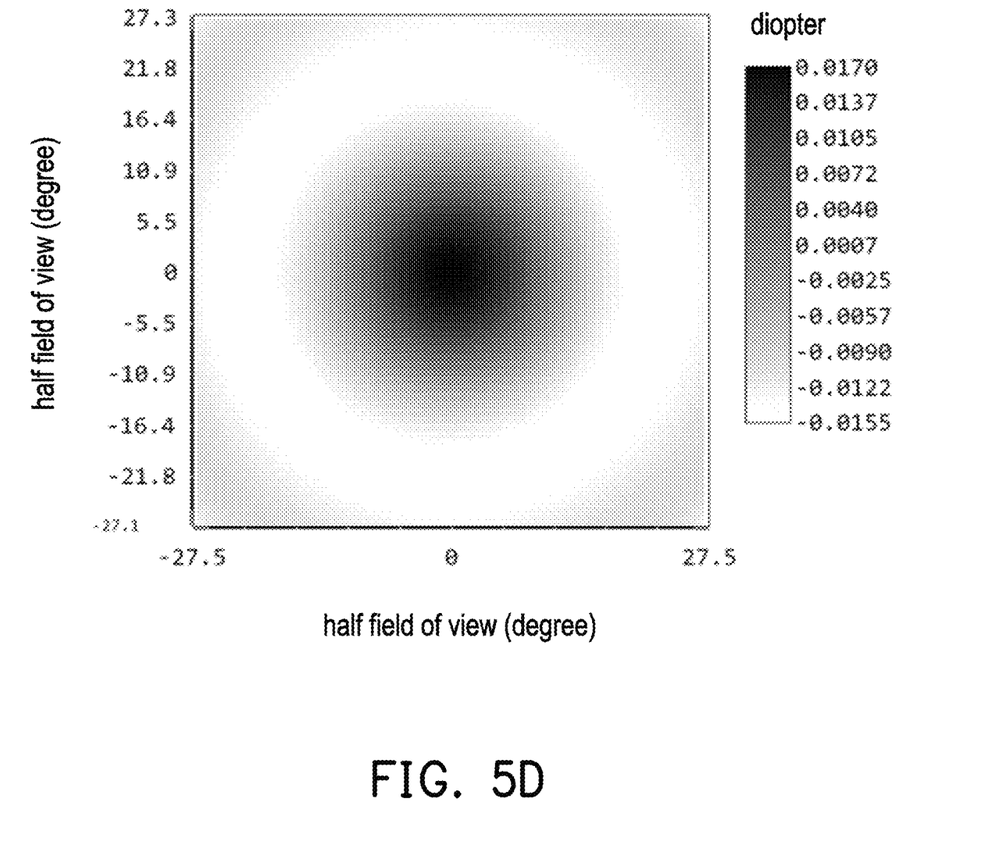
FIG. 5D is a power field map of an optical simulation of the curved mirror in FIG. 1 for penetrating light.

FIG. 5A illustrates a field curve of an optical simulation of the augmented reality display device of FIG. 1. FIG. 5B illustrates a distortion of an optical simulation of the augmented reality display device of FIG. 1. FIG. 5C illustrates a lateral color of an optical simulation of the augmented reality display device of FIG. 1. FIG. 5D is a power field map of an optical simulation of the curved mirror in FIG. 1 for penetrating light. Referring to FIG. 5A to FIG. 5D, in FIG. 5A to FIG. 5C, the curve corresponding to 0.4861 refers to the data obtained from light with a wavelength of 486.1 nanometers (nm), the curve corresponding to 0.5876 refers to the data obtained from light with a wavelength of 587.6 nm, and the curve corresponding to 0.6563 refers to the data obtained from light with a wavelength of 656.3 nm. Moreover, in FIG. 5A, the curve corresponding to "meridian" refers to the data obtained from light in the meridian direction, and the curve corresponding to the "sagittal" refers to the data obtained from light in the sagittal direction. For example, the curve corresponding to "0.4861 Meridian" refers to the data obtained from light in the meridian direction with a wavelength of 486.1 nm. In FIG. 5C, the curve corresponding to the Airy disc indicates the location of the Airy disc. The various imaging quality maps in FIG. 5A to FIG. 5C are all in a ray reverse tracing manner. Given that the pupil 50 is the direction where light enters, after the light passes through the optical elements of the augmented reality display device 100, the image which the image quality figures belong to is formed on the display 110. According to FIG. 5A to FIG. 5C, the augmented reality display device 100 of the embodiment has good imaging quality.

According to FIG. 5D, the absolute value of the diopter at each position of the curved mirror 150 is less than 0.02, so the user may not be affected by the diopter of the curved mirror when observing the external scenery.

Figure 6:
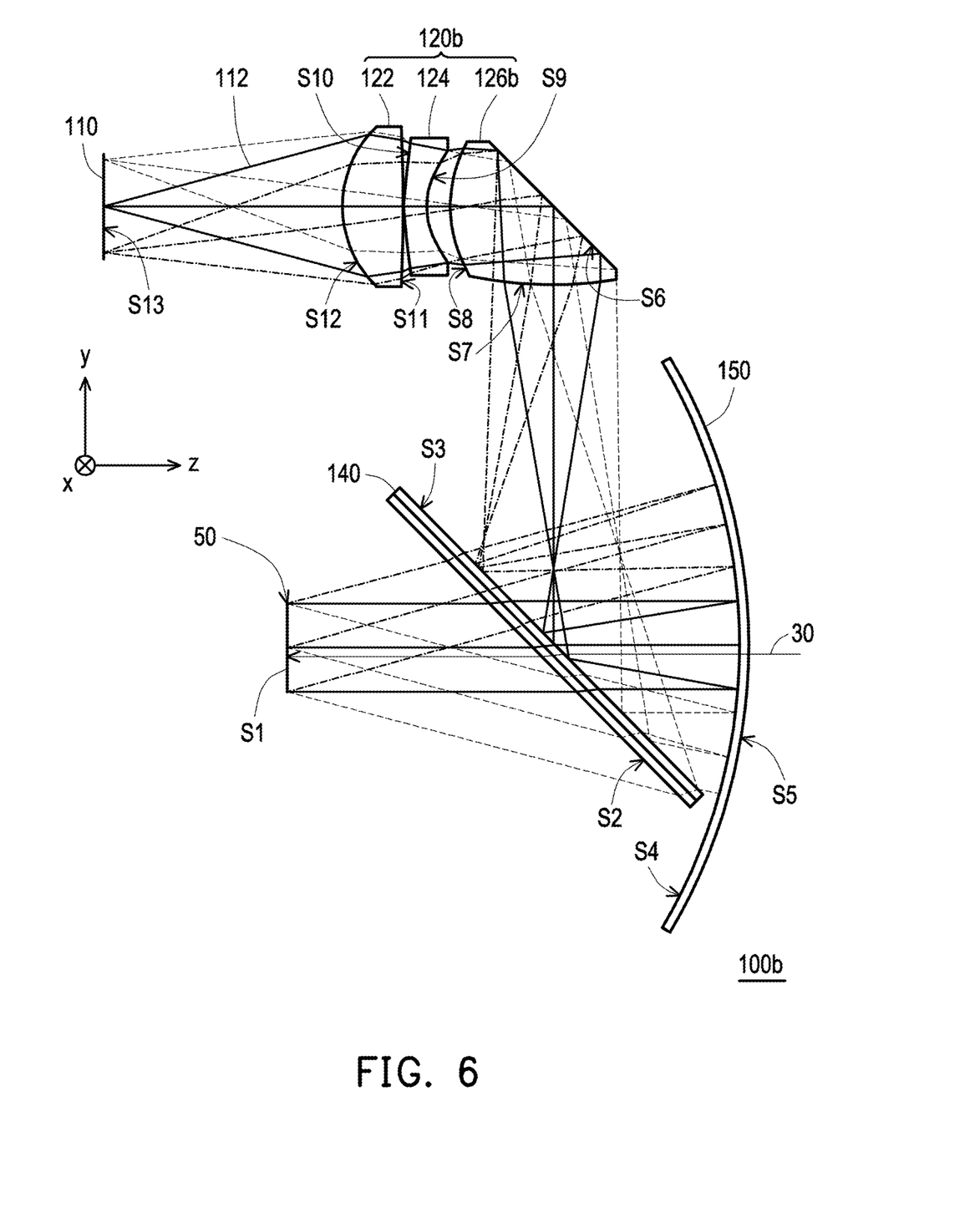
FIG. 6 is a structure diagram illustrating an optical path of an augmented reality display device according to another embodiment of the disclosure.

FIG. 6 is a structure diagram illustrating an optical path of an augmented reality display device according to another embodiment of the disclosure. Referring to FIG. 6, an augmented reality display device 100b of the embodiment is similar to the augmented reality display device 100 of FIG. 1, and the difference between the two is as follows. In the augmented reality display device 100b of the embodiment, a third lens 126b is a prism-shaped lens and has a first convex surface (i.e., the surface S8) facing the display 110, a reflecting surface (i.e., the surface S6), and a second convex surface (i.e., the surface S7) facing the beam splitting module 140. The image beam 112 from the second lens 124 penetrates through the first convex surface (i.e. the surface S8) and then is reflected by the reflecting surface (i.e. the surface S6) to the second convex surface (i.e. the surface S7). Subsequently, the image beam 112 penetrates through the second convex surface (i.e., the surface S7) and then is transmitted to the beam splitting module 140. In the embodiment, a reflecting film, such as a metal film or a dielectric film, may be formed on the reflecting surface (i.e., the surface S6).

Table 5 illustrates the global coordinates and the rotation angle of the surface of each optical element of the augmented reality display device 100b of the embodiment.

TABLE 5

| surface | global coordinates | | | rotation angle relative to x axis |
|---|---|---|---|---|
| | x | y | z | |
| S1 | 0 | 0 | 0 | 0 |
| S2 | 0 | 0 | 23.4986 | −45 |
| S3 | 0 | 0.48968 | 24.5593 | −45 |
| S4 | 0 | 0.48968 | 42.0588 | 0 |
| S5 | 0 | 0.48968 | 43.5588 | 0 |
| S7 | 0 | 33.5906 | 24.5593 | 90 |
| S6 | 0 | 40.7906 | 24.5593 | −45 |
| S8 | 0 | 40.7906 | 15.2593 | 0 |
| S9 | 0 | 40.7906 | 13.0471 | 0 |
| S10 | 0 | 40.7906 | 10.9417 | 0 |
| S11 | 0 | 40.7906 | 10.8442 | 0 |
| S12 | 0 | 40.7906 | 5.17973 | 0 |
| S13 | 0 | 40.7906 | −17.092 | 0 |

In Table 5, the surface S7 is the second convex surface of the third lens 126b facing the beam splitting module 140, the surface S6 is the reflecting surface of the third lens 126b, and the surface S8 is the first convex surface of the third lens 126b facing the display 110. Moreover, the physical meanings of the remaining surfaces S1 to S5 and S9 to S13 are the same as the physical meanings of the surfaces S1 to S5 and S9 to S13 in Table 1, which may not be repeated herein.

Table 6 illustrates the surface parameters of each optical element of the augmented reality display device 100b of the embodiment:

TABLE 6

| surface | radius of curvature (mm) | pitch (mm) | material | refractive index | Abbe number |
|---|---|---|---|---|---|
| S2 | infinity | 1.5000 | plastic | 1.492 | 57.44 |
| S3 | infinity | 17.4995 | | | |

TABLE 6-continued

| surface | radius of curvature (mm) | pitch (mm) | material | refractive index | Abbe number |
|---|---|---|---|---|---|
| S4 | −48.8981 | 1.5000 | plastic | 1.544 | 56.02 |
| S5 | −49.3674 | −1.5000 | | | |
| S4 | −48.8981 | −17.4995 | plastic | 1.544 | 56.02 |
| S3 | infinity | 33.1009 | | | |
| S7 | 40.4622 | 7.2000 | plastic | 1.544 | 56.02 |
| S6 | infinity | −9.3000 | | | |
| S8 | 8.9830 | −2.2121 | | | |
| S9 | 5.7282 | −2.1054 | plastic | 1.642 | 22.41 |
| S10 | 15.6710 | −0.0976 | | | |
| S11 | −110.9843 | −5.6644 | plastic | 1.544 | 56.02 |
| S12 | 9.0848 | −22.2721 | | | |
| S13 | infinity | — | | | |

In the embodiment, the surface S9 is a concave surface, the surface S10 is a convex surface, and both the surface S11 and the surface S12 are convex surfaces.

Table 7 illustrates the aspheric surface parameters of the surfaces S4, S5, S7, S8, S9, S10, S11, and S12 of the augmented reality display device 100b of the embodiment:

TABLE 7

| surface | K | $a_4$ | $a_6$ | $a_8$ |
|---|---|---|---|---|
| S4 | −0.8058 | −5.7250E−07 | 4.5125E−10 | −5.2291E−13 |
| S5 | −0.8054 | −5.3198E−07 | 3.3980E−10 | −4.2073E−13 |
| S7 | −5.1865 | 8.2433E−06 | 5.2083E−07 | −6.2048E−09 |
| S8 | −0.7012 | −6.1773E−06 | 6.8214E−06 | 4.9815E−09 |
| S9 | −3.1216 | −3.3865E−04 | 1.6577E−05 | 1.2232E−07 |
| S10 | −10.0004 | −6.9234E−04 | 1.2136E−05 | −2.7334E−08 |
| S11 | 6.0503 | 1.1178E−05 | −4.5924E−06 | 7.3884E−08 |
| S12 | 0.0803 | −1.1891E−04 | 1.1484E−06 | −5.0117E−08 |

In the embodiment, the aspheric coefficients $a_2$ of the surfaces S4, S5, S7, S8, S9, S10, S11, and S12 are all zero.

In the embodiment, the effective focal length EFL of the augmented reality display device 100b is −15.72 mm, the f-number FNO is 1.96, the diameter EPD of the eye box where the pupil 50 is located is 8 mm, and the field of view FOV (D) in the diagonal direction is 34.06 degrees. Table 8 lists numerical examples of some parameters of the augmented reality display device 100b of the embodiment.

TABLE 8

| EFL(mm) | −15.72 | V3 | 56.015 | 1/f1 + 1/f2 + 1/f3 | 0.064 |
|---|---|---|---|---|---|
| FNO | 1.96 | R1(mm) | −9.085 | D/L | 0.050 |
| FOV(D) | 34.06° | R2(mm) | 110.984 | |V1 − V2| | 33.606 |
| f1(mm) | 15.700 | TL | 26.580 | |V3 − V2| | 33.606 |
| f2(mm) | −15.328 | T12 | 0.098 | (R2 + R1)/(R2 − R1) | 0.849 |
| f3(mm) | 15.316 | T23 | 2.212 | TL/(T12 + T23) | 11.508 |
| L(mm) | 48.852 | Y22 | 5.407 | $Y22/D_H$ | 2.231 |
| D(mm) | 2.423 | CR1 | −48.898 | |CR2 − CR1|/d | 0.313 |
| V1 | 56.015 | CR2 | −49.367 | | |
| V2 | 22.409 | d | 1.5 | | |

Figure 7A:
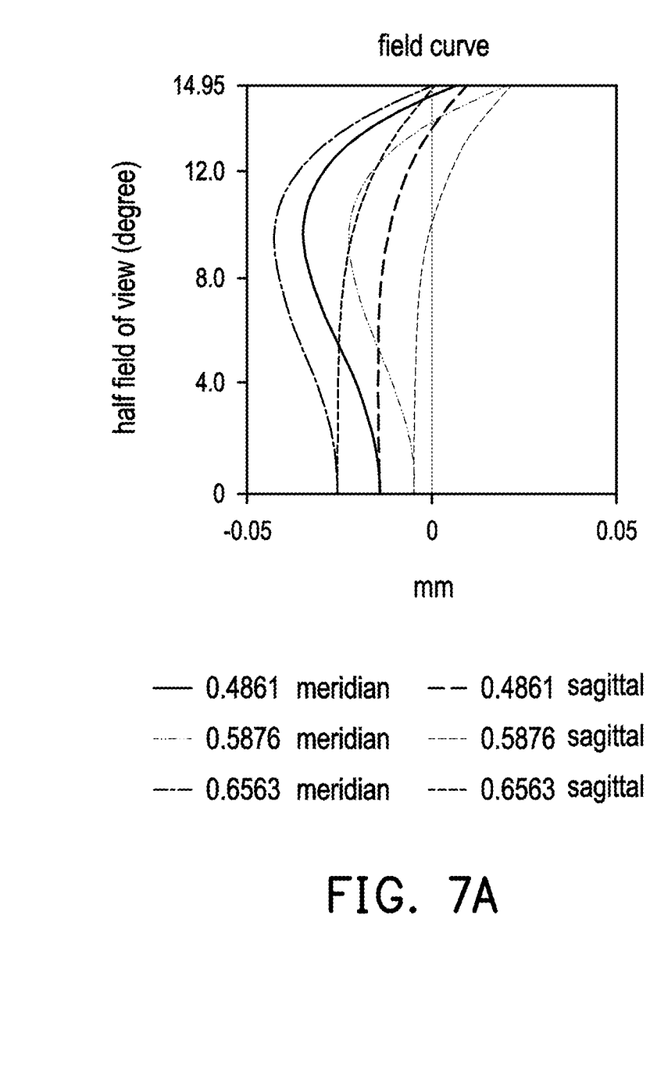
FIG. 7A illustrates a field curve of an optical simulation of the augmented reality display device of FIG. 1.
Figure 7B:
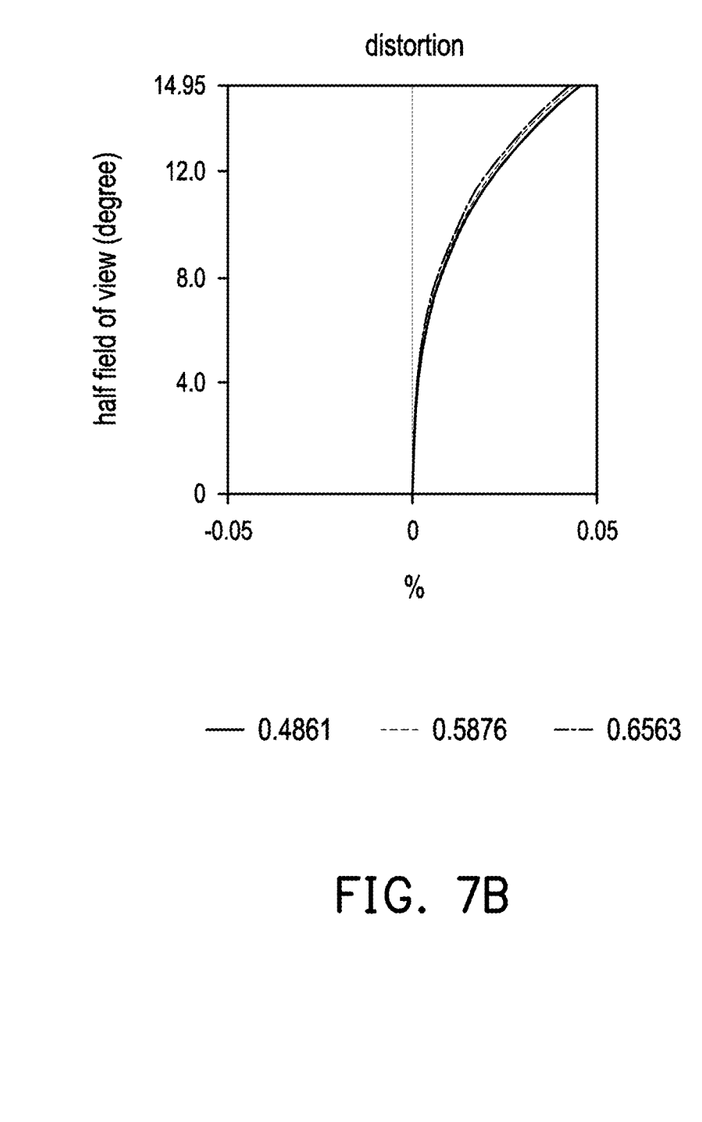
FIG. 7B illustrates a distortion of an optical simulation of the augmented reality display device of FIG. 1.
Figure 7C:
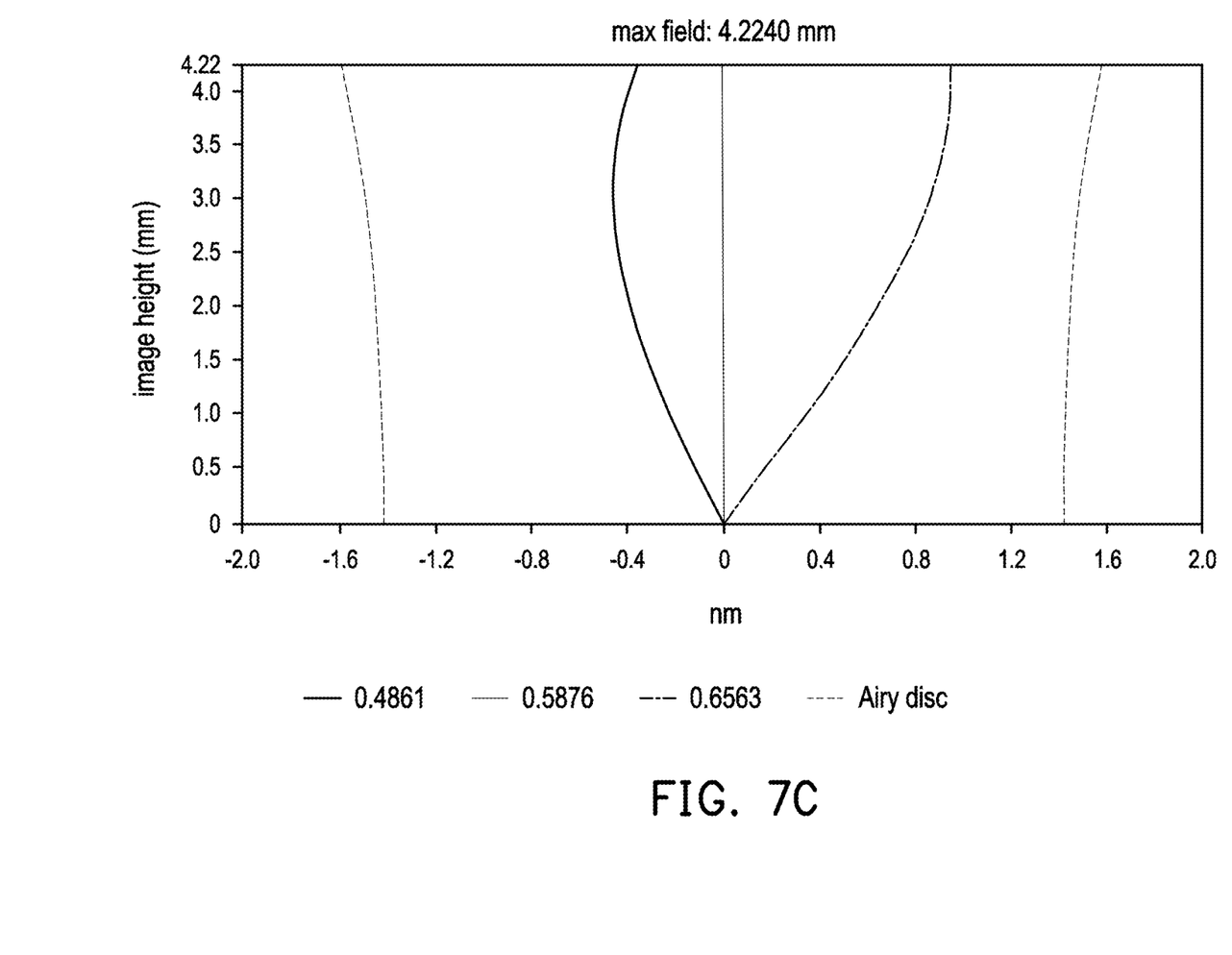
FIG. 7C illustrates a lateral color of an optical simulation of the augmented reality display device of FIG. 1.
Figure 7D:
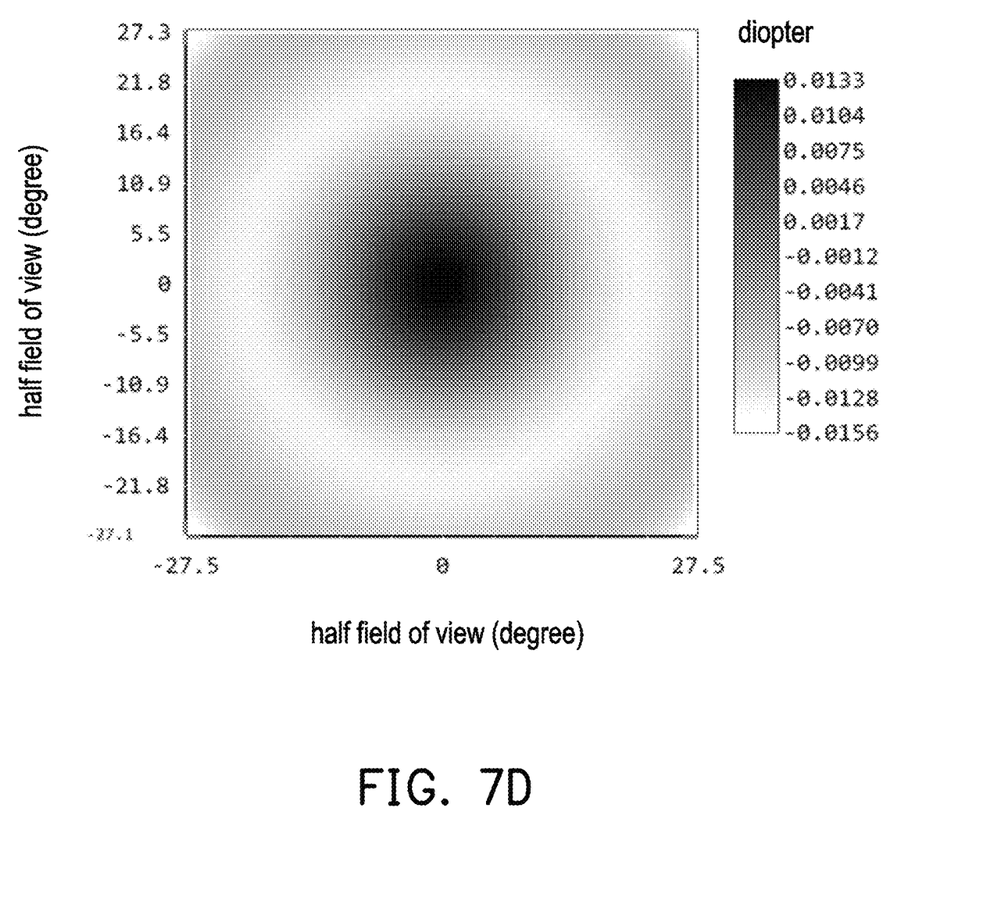
FIG. 7D is a power field map of an optical simulation of the curved mirror in FIG. 1 for penetrating light.

FIG. 7A illustrates a field curve of an optical simulation of the augmented reality display device of FIG. 1. FIG. 7B illustrates a distortion of an optical simulation of the augmented reality display device of FIG. 1. FIG. 7C illustrates a lateral color of an optical simulation of the augmented reality display device of FIG. 1. FIG. 7D is a power field map of an optical simulation of the curved mirror in FIG. 1 for penetrating light (e.g., the external light). Referring to FIG. 7A to FIG. 7D, in FIG. 7A to FIG. 7C, the curve corresponding to 0.4861 refers to the data obtained from light with a wavelength of 486.1 nm, the curve corresponding to 0.5876 refers to the data obtained from light with a wavelength of 587.6 nm, the curve corresponding to 0.6563 refers to the data obtained from light with a wavelength of 656.3 nm. Moreover, in FIG. 7A, the curve corresponding to "meridian" refers to the data obtained from light in the meridian direction, the curve corresponding to the "sagittal" refers to the data obtained from light in the sagittal direction. For example, the curve corresponding to "0.4861 Meridian" refers to the data obtained from light in the meridian direction with a wavelength of 486.1 nm. In FIG. 7C, the curve corresponding to the Airy disc indicates the location of the Airy disc. The various imaging quality maps of FIG. 7A to FIG. 7C are all in a ray reverse tracing manner. Given that the pupil 50 is the direction where light enters, after the light passes through the optical elements of the augmented reality display device 100, the image which the image quality figures belong to is formed on the display 110. According to FIG. 7A to FIG. 7C, the augmented reality display device 100b of the embodiment has good imaging quality.

According to FIG. 7D, the absolute value of the diopter at each position of the curved mirror 150 is less than 0.02, so the user may not be affected by the diopter of the curved mirror when observing the external scenery.

In summary, the augmented reality display device of the embodiment of the disclosure uses a relay lens set to magnify the display screen of the display, so a smaller display may be configured to obtain a larger field of view, and the resolution of the optical system is improved. Moreover, the augmented reality display device of the embodiment of the disclosure uses a polarizer, a brightness enhancement film, and a phase retardation film stacked together as a beam splitting module, so problems of luminous flux efficiency and ghost images may be improved, while maintaining image quality and reducing the production cost and the difficulty in manufacturing.

What is claimed is:

1. An augmented reality display device configured to be disposed on a head of a user, wherein the augmented reality display device comprises:
   a display configured to emit an image beam;
   a relay lens set disposed on a path of the image beam;
   a beam splitting module disposed on a path of the image beam from the relay lens set; and
   a curved mirror configured to reflect an image beam from the beam splitting module back to the beam splitting module, wherein the image beam reflected by the curved mirror penetrates through the beam splitting module and then is transmitted to a pupil of the user, wherein the beam splitting module comprises a polarizer, a brightness enhancement film, and a phase retardation film stacked together in sequence from a side adjacent to the pupil to a side adjacent to the curved mirror, and the polarizer, the brightness enhancement film and the phase retardation film are disposed between the curved mirror and the pupil of the user.

2. The augmented reality display device according to claim 1, wherein the brightness enhancement film is a reflective polarizing film or an advanced polarizer film.

3. The augmented reality display device according to claim 1, wherein the phase retardation film is a polymer phase retardation film.

4. The augmented reality display device according to claim 1, further comprising a reflecting sheet disposed on the path of the image beam and configured to reflect the image beam from the relay lens set to the beam splitting module.

5. The augmented reality display device according to claim 1, wherein the relay lens set comprises a first lens, a second lens, and a third lens disposed in sequence from a side adjacent to the display to a side far away from the display, wherein the first lens has a positive diopter, the second lens has a negative diopter, and the third lens has a positive diopter.

6. The augmented reality display device according to claim 5, wherein the relay lens set satisfies $0<1/f1+1//f2+1/f3<0.065$, where f1 is a focal length of the first lens, f2 is a focal length of the second lens, and f3 is a focal length of the third lens.

7. The augmented reality display device according to claim 5, wherein the augmented reality display device satisfies $0.04<D/L<0.22$, where D is a half length of a diagonal of an effective area of the display, and L is a distance between a center point of the effective area of the display and a surface of the third lens facing away from the display on an optical axis of the relay lens set.

8. The augmented reality display device according to claim 5, wherein the relay lens set satisfies $27.53<|V1-V2|<33.61$ and $27.53<|V3-V2|<33.61$, where V1 is an Abbe number of the first lens, V2 is an Abbe number of the second lens, and V3 is an Abbe number of the third lens.

9. The augmented reality display device according to claim 5, wherein the relay lens set satisfies $0< (R2+R1)/(R2-R1)<1$, where R1 is a radius of curvature of a surface of the first lens facing the display, and R2 is a radius of curvature of a surface of the first lens facing away the display.

10. The augmented reality display device according to claim 5, wherein the relay lens set satisfies $2.25<TL/(T12+T23)<11.52$, where TL is a distance from a surface of the first lens facing the display to a surface of the third lens facing away from the display on an optical axis of the relay lens set, T12 is an air gap between the first lens and the second lens on the optical axis, and T23 is an air gap between the second lens and the third lens on the optical axis.

11. The augmented reality display device according to claim 5, wherein the augmented reality display device satisfies $2.00<Y22/D<2.80$, where D is a half length of a diagonal of an effective area of the display, and Y22 is a maximum effective radius of a surface of the second lens facing the third lens.

12. The augmented reality display device according to claim 5, wherein the third lens is a prism-shaped lens and comprises a first convex surface facing the display, a reflecting surface and a second convex surface facing the beam splitting module, the image beam from the second lens penetrates through the first convex surface and then is reflected by the reflecting surface to the second convex surface, and subsequently the image beam penetrates through the second convex surface and is transmitted to the beam splitting module.

13. The augmented reality display device according to claim 1, wherein the curved mirror comprises a concave surface facing the beam splitting module and a convex surface facing away from the beam splitting module, and a partially penetrating and partially reflecting film is formed on the concave surface.

14. The augmented reality display device according to claim 1, wherein the curved mirror comprises a concave surface facing the beam splitting module and a convex surface facing away from the beam splitting module and satisfies $0<|CR2-CR2|/d<1$, where CR1 is a radius of curvature of the concave surface, CR2 is a radius of curvature of the convex surface, and d is a distance from the concave surface to the convex surface on an optical axis of the curved mirror.

15. The augmented reality display device according to claim 1, wherein the brightness enhancement film is formed by stretching multiple polymer film layers with different refractive indexes, a stretching direction of the brightness enhancement film is perpendicular to a penetration axis of the polarizer, and an angle of 45 degrees or 135 degrees is between the stretching direction of the brightness enhancement film and a slow axis of the phase retardation film.

16. The augmented reality display device according to claim 1, wherein the beam splitting module further comprises a transparent substrate, wherein the transparent substrate, the polarizer, the brightness enhancement film, and the phase retardation film are stacked together in sequence from a side adjacent to the pupil to a side adjacent to the curved mirror.

17. The augmented reality display device according to claim 1, wherein the beam splitting module further comprises a transparent substrate, wherein the polarizer, the transparent substrate, the brightness enhancement film, and the phase retardation film are stacked together in sequence from a side adjacent to the pupil to a side adjacent to the curved mirror.

18. The augmented reality display device according to claim 1, wherein the phase retardation film is a polymer quarter-wave plate.

19. The augmented reality display device according to claim 18, wherein after the image beam from the relay lens set penetrates through the phase retardation film, S-polarized light in the image beam is reflected by the brightness enhancement film back to the phase retardation film, the S-polarized light in the image beam is converted into circularly polarized light by the phase retardation film and transmitted to the curved mirror, the curved mirror reflects the circularly polarized light back to the phase retardation film, the phase retardation film converts the circularly polarized light into P-polarized light, and the P polarized light sequentially penetrates the brightness enhancement film and the polarizer and is transmitted to the pupil.

20. The augmented reality display device according to claim 1, wherein external light sequentially penetrates through the curved mirror, the phase retardation film, the brightness enhancement film, and the polarizer and then is transmitted to the pupil.

* * * * *